Nov. 3, 1931.　　　　A. S. WALKER　　　　1,829,771
MEASURING DEVICE
Filed Jan. 5, 1924
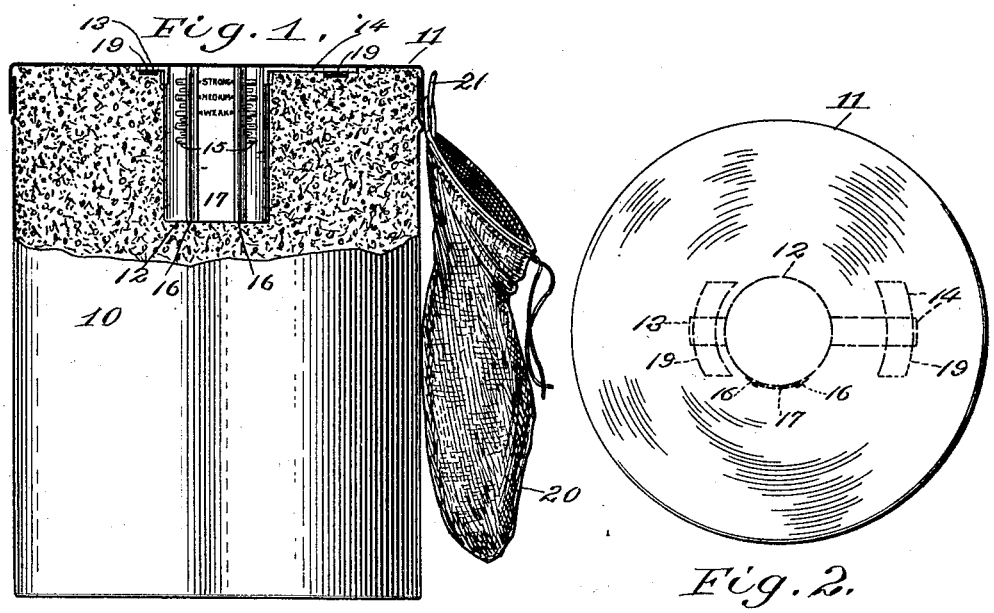
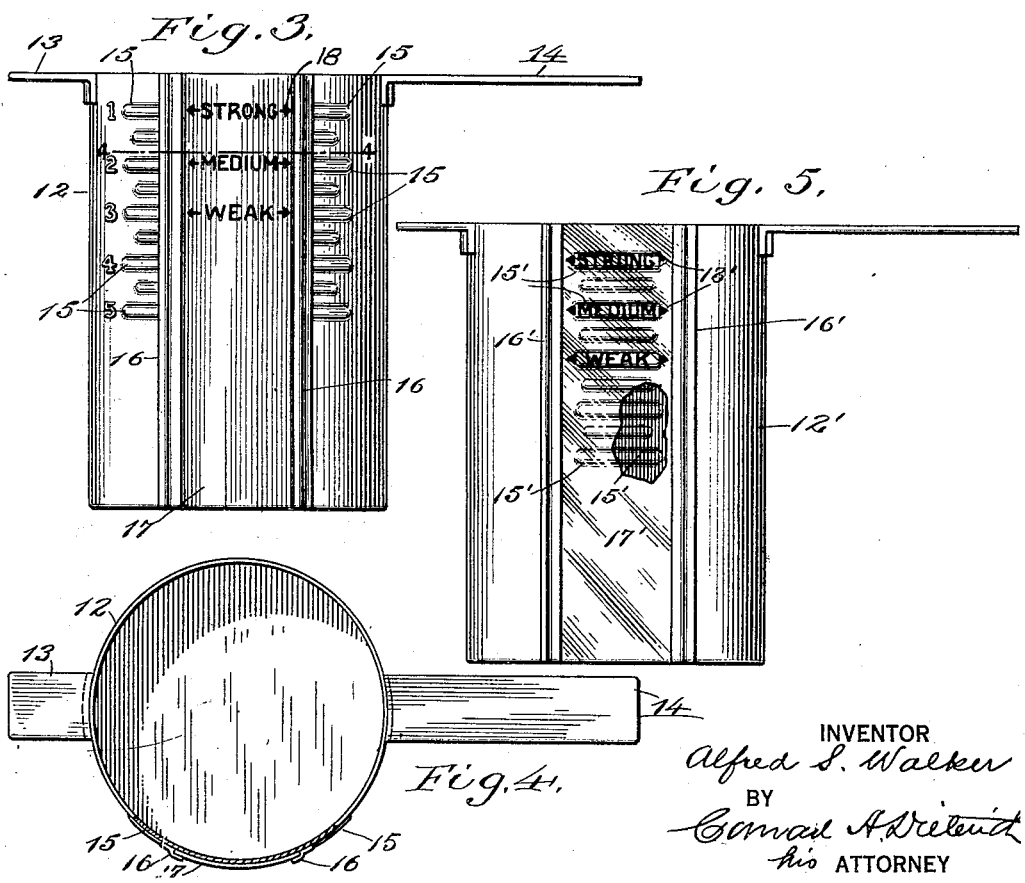
INVENTOR
Alfred S. Walker
BY
Conrad A. Dieterich
his ATTORNEY Patented Nov. 3, 1931

1,829,771

UNITED STATES PATENT OFFICE

ALFRED S. WALKER, OF NEW ROCHELLE, NEW YORK

MEASURING DEVICE

Application filed January 5, 1924. Serial No. 684,680.

My invention relates to improvements in measuring devices, and the same has for its object more particularly to provide a simple, convenient and accurate device which may be used for dispensing measured charges of substances in connection with which the same is packed.

Further, said invention has for its object to provide a device which may be conveniently arranged within or attached to a receptacle containing the substance which is to be measured or gauged.

Further, said invention has for its object to provide a device which may be conveniently packed in a receptacle containing the substance to be measured, and provided with means to indicate the amount of the substance which must be used to produce a solution of predetermined density or strength.

Further, said invention has for its object to provide a device which may be detachably secured to a receptacle or the cover therefor, in order to serve as a container for a bag or strainer used in the preparation of the substance packed within said receptacle.

Further, said invention has for its object to provide a measuring device adapted to be packed within the receptacle containing the substance in connection with which said device is to be used, and provided with means whereby different scale plates bearing different graduations or calibrations may be readily attached to or removed from said measuring device to permit of the use of said device in connection with different substances or products.

Further, said invention has for its object to provide a measuring device adapted to be used in connection with receptacles containing coffee, tea and other substances in order to enable one to determine the exact amount, for example, of coffee of the particular brand or kind contained in said receptacle which must be used in order to produce the best results possible.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings forming a part of this specification—

Figure 1 is a side elevation partly broken away and in section showing one form or embodiment of my said invention;

Fig. 2 is a plan or top view;

Fig. 3 is an enlarged side view of the measuring device, detached from the cover of a receptacle;

Fig. 4 is a horizontal section on the line 4—4 of Fig. 3, and

Fig. 5 is a side view illustrating a modified construction.

In said drawings 10 designates a receptacle of the general type usually employed for the packing of coffee, tea, cocoa and the like. The said receptacle may be made of sheet metal or other suitable material, and of any desired size and shape, and provided with a separate cover 11.

The measuring device which may be made of any suitable metal or material, and of any suitable size or shape but is here shown as a cylindrical metal cup 12 and provided at its upper edge with one or more horizontally projecting members 13, 14. The member 14 is made sufficiently long to serve as a handle.

Upon the side of the cup 12 are provided a plurality of circumferential ribs or gauge marks 15 associated with which are indicating characters in the form of numerals 1, 2, 3, 4. The ribs or gauge marks 15, and indicating numerals are preferably struck up from the body of the cup 12, so as to be visible upon both the inner and outer sides thereof.

Upon the outer side of the cup 12, and at right angles to said ribs or gauge marks 15 are secured guides or retaining members 16, 16 adapted to receive a removable scale plate 17 upon which are arranged certain designations, as for example, "Strong", "Medium", and "Weak", and an arrow point 18 adjacent to each end of said designations, which arrow points are arranged substantially in alignment therewith.

The scale plate 17 may be made of metal, cardboard or any other suitable material and the calibration or graduations, together with the words or designations associated therewith may be printed, stamped or otherwise marked thereon.

Upon the underside of the cover 11 of the receptacle may be provided straps or ears 19 to receive the handle member 14, and the projection 13 in order to hold said measuring cup 12 removably attached to the underside of said cover during transportation, and when said cup 12 is not in use.

20 denotes a small bag or sack made of fabric, and provided along its upper edge with a draw string whereby the mouth of said bag may be closed.

In the modification illustrated at Fig. 5, the cup construction 12' is essentially the same as above described, except that in said modification the gauge marks or ribs 15', instead of being arranged at the opposite outer sides of the guides or retaining members 16', 16', are disposed intermediate said guides 16', 16', and the scale 17' is made of suitable transparent material, such, for example, as celluloid or similar material, and has the arrow points 18' and designations "Strong", "Medium", and "Weak" printed or otherwise marked thereon so as to register with certain of said gauge marks or ribs 15'.

The receptacle 10, or the cover 11 thereof may be provided with a struck-up tongue or similar device 21 to support the bag 20 when not in use or while drying after use.

The invention has been shown and described as applied to or in connection with a receptacle designed to contain ground coffee, and the measuring cup 12 is provided with a scale plate having three indications thereon to show the height to which said cup should be filled with the particular brand of coffee packed in the receptacle to produce one cup of coffee of the particular strength desired.

By preference the cup 12 has the gauge marks or ribs 15 so formed or struck-up that the same appear both upon the inner and outer sides thereof in order to enable the user readily to determine the height of the coffee in said cup.

The bag 20 should preferably be of such size to conveniently receive and hold sufficient coffee to produce six cups, and the coffee may be retained therein during the boiling to insure a clean product. When not in use the bag may be emptied of its contents, and then hung up upon the tongue or hook 21 to permit the same to dry. During shipment and storage the bag 20 may be packed within the cup 12 where the same will be entirely free from contact with the contents of the receptacle 10.

It will, of course, be understood that different brands, or mixtures of coffee may require greater or lesser amounts thereof to produce correspondingly "strong", "medium" or "weak" coffee. To enable a user to obtain the best results without necessity of experimentation, the manufacturer or producer will, with each particular brand or mixture of coffee, supply the measuring cup 12 properly calibrated or will supply said cup with the appropriate scale plate 17 to enable the user immediately, and without trial, to determine the amount of coffee he must use for each cup to produce the desired strength.

Further, it is to be noted, while I have described my said invention in conection with the production of coffee or the like, that the invention is not limited to coffee but may be used in connection with any product possessing known qualities or characteristics, and which is soluble in a fluid, or from which any element or constituent may be extracted or attained by solution, extraction or other process, to yield a given quantity of fluid mixture or extract of predetermined strength, color, density or other characteristics.

Having thus described my said invention, what I claim and desire to secure by Letters Patent is—

1. A measuring device comprising a receptacle, fixed indicating means on said receptacle, holding means on said receptacle, and a removable transparent scale-plate disposed within said holding means and covering said fixed indicating means; said removable scale-plate having fixed indicating means thereon cooperating with the indicating means on said receptacle to indicate the quantity required of a product to produce a predetermined mixture, substantially as specified.

2. A measuring device comprising a receptacle, a handle therefor, fixed indicating means on said receptacle, a holder disposed upon said receptacle adjacent to said fixed indicating means and having a vertical opening therein, and a transparent scale-plate removably disposed within said holder; said scale-plate having indicating means thereon cooperating with the fixed indicating means on said receptacle to indicate the quantity required of a product to produce a given quantity of a mixture of a predetermined character, said fixed indicating means underlying said transparent scale-plate substantially as specified.

3. The combination of a container, a cover therefor, and retaining means provided on the inner side of said cover, with a measuring receptacle having a handle and a projection extending oppositely from the top thereof and detachably engaging said retaining means, whereby to hold said receptacle attached to said cover, substantially as specified.

4. A measuring device for use in connection with a container adapted to receive a soluble product; said device comprising a measuring receptacle, means for securing said measuring receptacle within said container, fixed indicating means on said measuring receptacle, a holder on said measuring receptacle, a scale plate removably disposed within said holder, said scale plate having calibrations thereon cooperating with the indicating means on said measuring receptacle to indicate the quantity required of said soluble product to produce a given quantity of fluid mixture of predetermined strength or character, substantially as specified.

5. A measuring device for use in connection with a container adapted to receive a soluble product; said device comprising a measuring receptacle, a handle and a member extending from said measuring receptacle, fixed indicating means on said measuring receptacle, a removable scale plate having calibrations thereon cooperating with the fixed indicating means on said measuring receptacle to indicate the quantity required of said soluble product to produce a given quantity of fluid mixture of predetermined strength or character, retaining means on said measuring receptacle for said scale plate whereby to hold said scale plate operatively associated with the indicating means on said measuring receptacle, and means for detachably securing said measuring receptacle to said container, substantially as specified.

6. A measuring device for use in connection with a container adapted to receive a soluble product; said device comprising a cup with lateral projections at its mouth by means of which it may be secured to the cover of said container, said device having a vertical scale holder, a scale-plate held by said holder and having visible graduations indicative of the degrees of strength and said cup having scale marks indicative of quantity arranged adjacent said holder and extending transversely with respect thereto, said scale marks and said graduations cooperating to indicate the quantity required of said soluble product to produce a given quantity of fluid mixture of predetermined strength or character.

Signed at the city of New York, in the county and State of New York, this 28th day of May, one thousand nine hundred and twenty-three.

ALFRED S. WALKER.